United States Patent [19]

Bandy, Jr. et al.

[11] Patent Number: 5,131,724
[45] Date of Patent: Jul. 21, 1992

[54] CONVEYOR PAN WITH KEYED DECK

[75] Inventors: Clarence L. Bandy, Jr., Glade Spring, Va.; William J. Reid, Bristol, Tenn.

[73] Assignee: American Longwall Mining Corporation, Abingdon, Va.

[21] Appl. No.: 737,672

[22] Filed: Jul. 30, 1991

[51] Int. Cl.$^5$ .......................... B65G 19/28; F21C 35/20
[52] U.S. Cl. ..................................... 299/43; 198/735.2; 198/735.3
[58] Field of Search ................. 299/43, 18; 198/735.1, 198/735.2, 735.3, 860.1, 860.2, 860.3

[56] References Cited

U.S. PATENT DOCUMENTS

| | | | |
|---|---|---|---|
| 4,013,167 | 3/1977 | Bourgeois | 198/860.2 |
| 4,373,757 | 2/1983 | Gehle et al. | 299/43 |
| 4,484,677 | 11/1984 | Berwald | 198/735.1 |
| 4,632,239 | 12/1986 | Schoop et al. | 198/735.4 |
| 4,637,510 | 1/1987 | Tomlinson | 198/860.3 X |

FOREIGN PATENT DOCUMENTS 3628179 2/1988 Fed. Rep. of Germany .
2106066 4/1983 United Kingdom ............. 198/735.2

*Primary Examiner*—David J. Bagnell
*Attorney, Agent, or Firm*—King & Schickli

[57] ABSTRACT

A pan assembly for a conveyor line of an armored face conveyor includes an elongated deck plate defining the feed path of the conveyor system and a pair of parallel side members. Spaced keys extend outwardly from the deck plate to fit in corresponding slots in the side members. The slots are open to the outside to expose the keys and welds extend along these outer edges to attach the keys to the side members. The deck plate rests on the lower edge of the slots. The side members are sigma sections with the center portion having the slots being recessed.

11 Claims, 2 Drawing Sheets

CONVEYOR PAN WITH KEYED DECK

BACKGROUND OF THE INVENTION

The present invention relates to the field of conveyors, and more particularly, to a pan assembly for an armored face conveyor, such as for handling coal in a longwall mining system.

Armored face conveyors are literally the foundation of longwall mining machines. Typically, the conveyor line pan assembly includes a hardened steel deck plate attached to supporting cast steel side members. A plurality of these pans are assembled in end to end relationship to form a complete conveyor system to move the coal along the face being mined.

In addition, the side members support the haulage system for the shearer. A scraper chain extends along the entire conveyor system with spaced flights serving to move the coal along the deck. Clearly, the strength of the conveyor pan assembly of the armored face conveyor and its structural integrity is of a primary concern. Eliminating structural failures in the conveyor system, and thus minimizing down time, is important to assure an efficient longwall mining operation.

The main approach in past designs attempting to increase the life of a conveyor pan is simply the modification of the welded joint between the deck plate and the side members. In the past, the focus has been on attempting to make the longitudinal weld withstand wear at the same rate as the deck plate, since in these designs the scraper chain engages the weld. Because the weld material is not as hard as the deck plate it tends to wear quickly.

Generally speaking, the industry follows the approach of butt welding the lateral edges of the deck plate to a corresponding edge on the side members. Modifications to common butt welding techniques include chamfering the edges and then welding along the top and bottom to form a joint; providing a narrow shoulder to support the edge of the deck plate and apply top and bottom fillet welds; and splitting the side members and welding to top and bottom plates. For example, see the U.S. Pat. Nos. to Berwald, 4,484,677, issued Nov. 27, 1984; Skolik et al. 4,420,075 issued Dec. 13, 1983; and Gehle et al. 4,373,757, issued Feb. 15, 1983; respectively.

While some of these modifications have provided limited improvement, typically the weld bead joining the deck plate to the sides of the conveyor pan assembly is still the governing factor limiting the life of the armored face conveyor pan. As a result, the life of conveyor system is seriously restricted. Elimination of the wear factor of the conveyor pan, as well as simply the improving the overall strength and integrity of the pan is thus desirable.

Furthermore, improvement in the manufacturing efficiency of the pan assembly is desirable. When dealing with welding along the typical butt joints between the deck plate and the side members, it is normally necessary to set up manufacturing jigs to align the two edges being welded. This is a costly and time consuming process, especially in light of the substantial weight of these component parts. Finding a way in which the parts could be self aligning and supporting could represent significant savings in the overall cost of a conveyor system.

It is also recognized in the art that the amount of welding required along the typical butt joint that is subject to scraper chain conveyor wear is excessive. In the past, some effort has been made to reduce the number of welding passes required to form a reasonably strong joint, but these efforts have not resulted in any appreciable success. At least approximately 18 welding passes is standard in the industry in order to ensure reasonable strength and integrity of the joints. A manner in which the welding operation could be reduced would also go a long way in further reducing the original manufacturing cost of these conveyor systems.

Finally, the limited shear strength of the typical butt weld joint for connecting the deck plate to the side members results in failures that are rather frequent, thus adding another cause to deleterious shutdowns of the conveyor system for repairs. Typically, the shear force applied to the joint causes cracking of the weld and eventual failure. A way in which to reduce the shear forces acting on the weld joint would help in further improving the life of the conveyor pan assembly.

SUMMARY OF THE INVENTION

Accordingly, it is a primary object of the present invention to provide a conveyor pan assembly having increased strength and structural integrity by overcoming the shortcomings of the prior art.

It is another object of the present invention to provide a conveyor pan in which the typical butt welded joint between the deck plate and the side members in the path of the scraper chain conveyor is eliminated to provide improved strength and integrity.

It is still another object of the present invention to provide a conveyor pan assembly for use with armored face conveyors wherein the wear factor of the weld is not a concern.

Another related object of the present invention is to provide a conveyor pan in which the weld joint is moved to the outside of the side members and is protected.

Another object of the invention is to provide an improved joint in a conveyor pan wherein shear forces are virtually eliminated.

Still another object of the present invention is to provide a conveyor pan assembly with a joint requiring reduced weld passes and a weld area that is easier to access.

Still another object of the present invention is to provide a concept for a welded joint for a conveyor pan wherein the conveyor components are self supporting during manufacture.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, the improved conveyor pan assembly adapted for use with an armored face conveyor system comprises an elongated deck plate, a pair of parallel side members, a plurality of spaced keys extending outwardly along the lateral edges of the deck plate fitting into corresponding slots in the side members and attaching means for the keys to the side members. With this arrangement, the deck plate is directly supported by engagement of the keys in the slots of the side members providing enhanced strength and integrity of the pan assembly.

In the preferred embodiment of the invention, the slots are open to the outside of the side members, which are preferably sigma shaped, and the means to permanently attach the deck plate to the side members includes a fillet weld extending only along each key and the corresponding upper edge of the slot on the outside face. The required strength is obtained by approximately twelve weld passes, or about one-third less passes, with this arrangement. Since there is no direct shear force applied to the welded joint, the limiting factor in the strength of the conveyor pan assembly is no longer the welded joint. Furthermore, the weld is easy to access from the outside making original fabrication easier, as well as repairs.

Also during manufacturing, since the deck plate can be supported by the lower edge of the slots in the side members, a positive datum point is provided for accurate assembly and there is no need for expensive welding jigs and time consuming adjustments.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE PREFERRED EMBODIMENT

Figure 1:
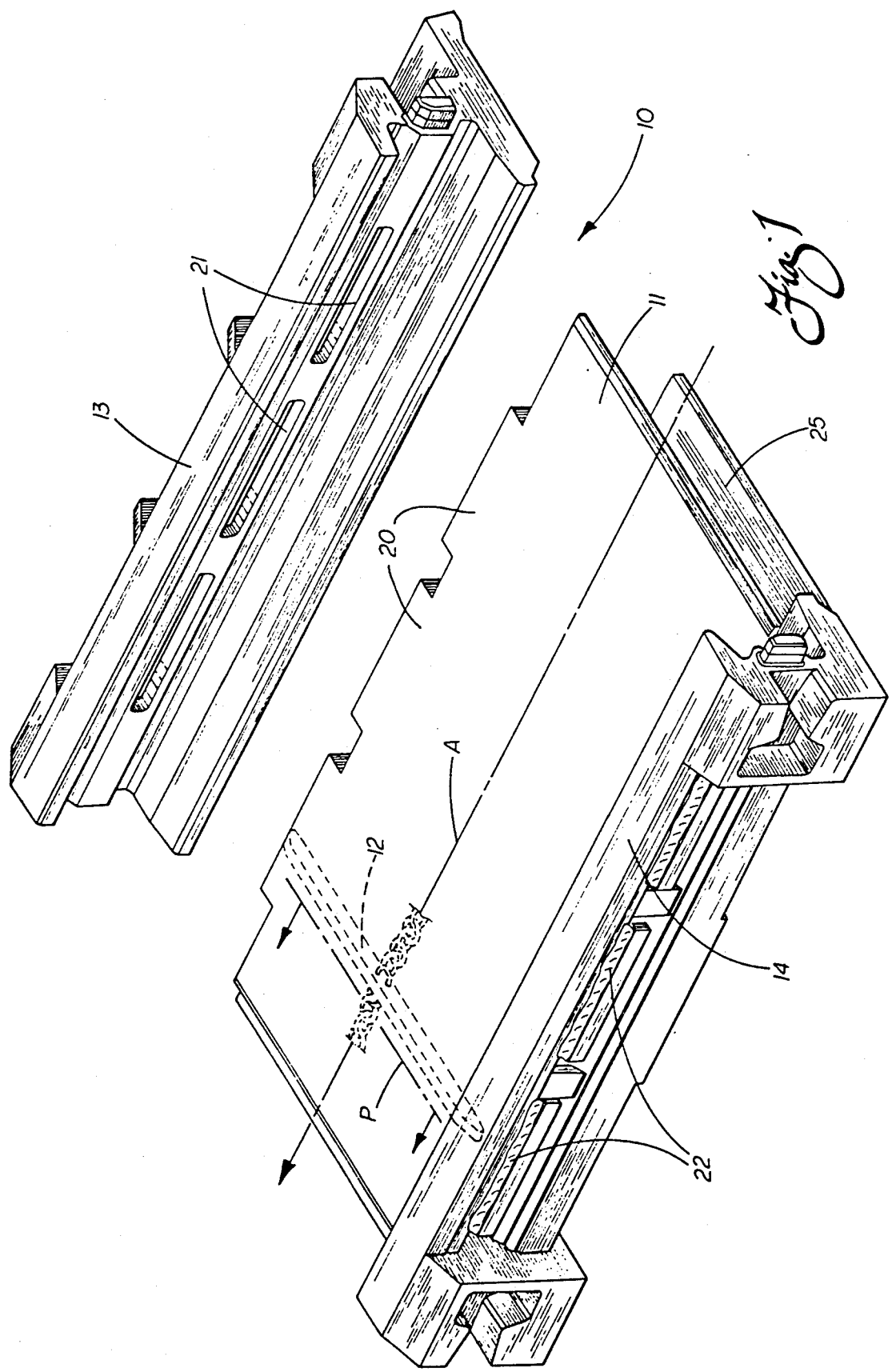
FIG. 1 is a perspective, exploded view of the conveyor pan assembly showing the manner in which the spaced keys fit into the corresponding slots along the side members.

With reference now to FIG. 1 of the drawings for a more complete review and analysis of the preferred embodiment, there is shown a conveyor pan assembly 10, especially adapted for use with an armored face conveyor system for handling coal or the like. An elongated deck plate 11 serves to define the feed path P for the coal extending along the longitudinal axis A of the conveyor system. As is conventional, the feeding of the coal along the conveyor pan assembly 10 is by a scraper chain with individual flights 12; one shown in dashed line outline in FIG. 1.

A pair of parallel side members 13, 14, preferably formed as sigma sections and extending along opposite sides of the deck plate 11, further define the feed path P. To take the heavy loads provided by the scraper chain conveyor, the coal being transported and the haulage system that is also supported by the conveyor pan assembly, the deck plate 11 is preferably formed of high tensile strength, hardened steel. The sigma section side members 13, 14 are preferably cast steel, and when assembled according to the present invention with the deck plate 11, substantially enhanced strength of the composite structure is provided.

As will be seen more in detail later, the butt welded joints of the prior art inside the feed path P are eliminated so that wear of the welds is eliminated as a factor in the life of the pan assembly. The hardened deck plate 11 alone can efficiently resist the high abrasion forces inherently present as a result of the flights 12 moving the coal or other aggregate material along the conveyor system.

In addition, the high strength required, not only for the support of the haulage equipment by the armored face conveyor system, but also necessary to resist the forces encountered as the system is pushed side ways for advancing along the mining face, is provided in a manner not heretofore possible with prior designs. Also as will be seen, the failure due to shear forces along the welded joints is no longer a factor of concern in the life of the pan assembly.

In accordance with a primary factor in the enhanced strength of the pan assembly 10 of the present invention, a plurality of spaced keys 20 are provided along the lateral edges of the deck plate 11. Corresponding key receiving slots 21 are formed in each of the side members 13, 14. The deck plate 11 is mated with the side members Without inside welds so that the feed path P is defined by smooth and uninterrupted boundaries on both sides (see FIG. 2).

In order to provide permanent means for attaching the deck plate 11 to the side members 13, 14, the key receiving slots 21 extend all the way through said side members. With the slots 21 thus open to the outside of the side members 13, 14, the keys 20 can be efficiently attached to the side members by fillet welds 22 positioned along the outer edges of the keys and the corresponding upper edge of the slots 21 (see FIGS. 1-3). Each key 20 and slot 21 forms a unit, and by strength analysis the desired number for any length pan assembly 10 can be easily determined; the standard length pan assembly 10 requiring three key/slot units, as shown.

As mentioned above it has been found that with this arrangement, one third less weld passes are required than with the old method employing butt welded joints along the inside of the pan assembly. Also, as will be recognized, the welds 22 are required only in the limited length segments corresponding to the keys 20, rather than the full length of prior art references utilizing butt joints. Increased strength is obtained, even without welding along the corresponding lower supporting edge of the slots, as is evident in the drawings.

Figure 2:
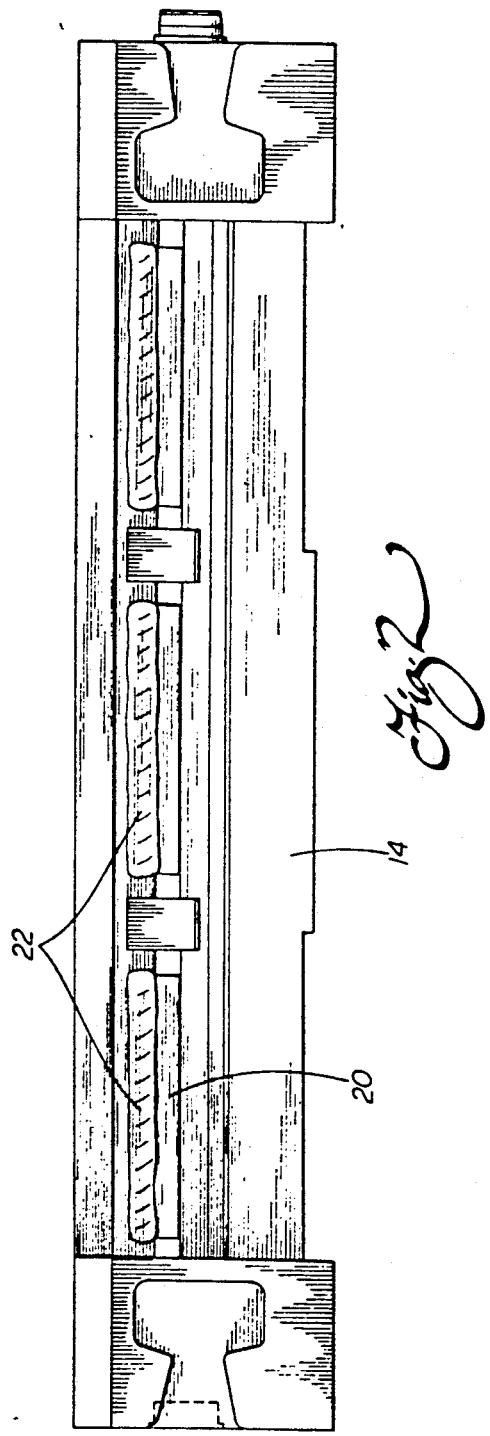
FIG. 2 is a partial cross section taken at line 2—2 of FIG. 1 illustrating the manner in which the deck plate extends through the side member and an outside weld provides for permanent attachment.
Figure 3:
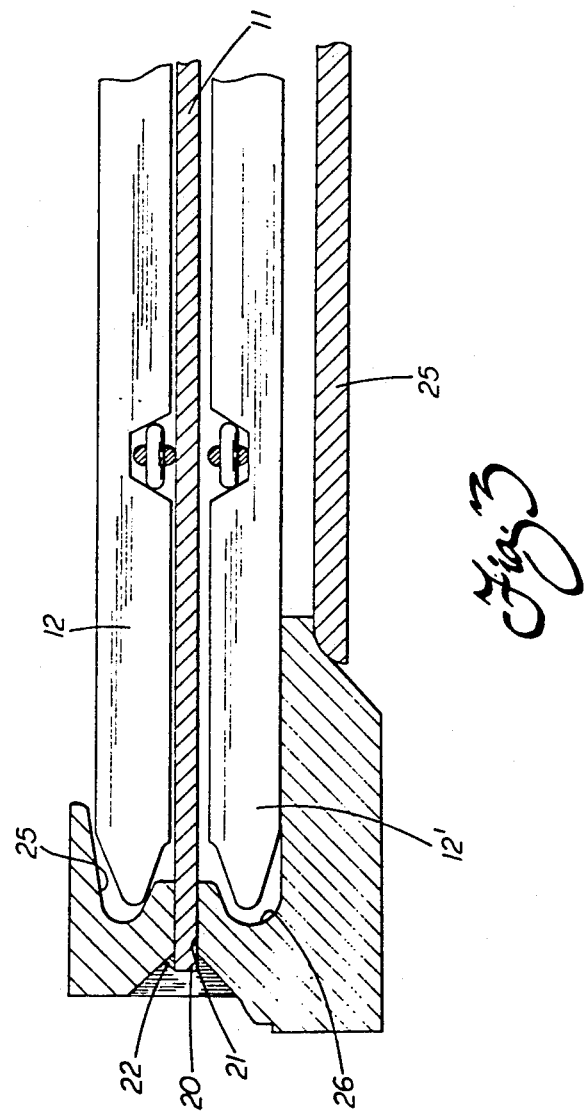
FIG. 3 is a side view of the side member showing the manner in which the welds are attached to the outer edges of the keys.

The side members 13, 14 preferably are formed as sigma sections, as mentioned above, and this is standard in the industry. As best illustrated in FIG. 2, the top and base portions of the sigma sections are connected by an offset center portion, in which the slots 21 are formed. Due to the recess of the center portion, the welds 22 are protected from being hit, and possibly damaged, by heavy equipment that might bump or fall on the conveyor system during operation.

Also, the sigma section profile provides concave guide walls 25, 26 in the top/base portions, respectively. As illustrated and referenced above, these side walls provide smooth, uninterrupted boundaries for engagement with the scraper chain flights 12; the upper feed flights 12 being guided by the opposite walls 25 in the top portion and the return flights 12' being guided by the walls 26 in the base portion. Smoother operation of the scraper chain is an added advantage due to these smooth boundaries resulting from the absence of typical butt welded joints.

The most important factor in the enhanced strength of the keyed deck pan concept is the actual support of the entire elongated deck plate 11 by engagement of the keys 20 with the lower support edge of the corresponding slots 21 (see FIG. 2). This direct mechanical support without intervention by a welded joint is a substantial factor in the enhanced strength and integrity of the pan assembly 10 of the present invention. This arrangement eliminates entirely the presence of a large shear force in a welded joint, such as the butt welded joint required by the prior art. The weld 22 does not receive a direct shearing force since the weight of the deck plate 11 and the coal being conveyed is transmitted almost exclusively from the supporting faces of the keys 20 and the lower edge of the slots 21.

A related advantage of this support arrangement comes into play during manufacturing. In order to assemble and weld the component parts into a completed pan assembly 10; (1) the two side members 13, 14 are simply placed in position on the floor of the manufacturing facility. (2) the deck plate 11 is positioned by an overhead crane with respect to one of the side members 14 so as to engage the keys 20 and the slots 21, and then (3) the remaining side member 13 is moved into position with the keys 20 entering their corresponding slots 21. Once the keys 20 are engaging all of the slots 21, all that is necessary is to provide the welds 22 to complete the assembly. A cross piece 25 is then welded in position and any other finishing requirements are completed. When thus assembled, a conveyor pan assembly 10 with enhanced strength and improved performance is provided while minimizing the cost of manufacture.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A conveyor pan assembly for an armored face conveyor system for handling coal or similar relatively heavy aggregate material comprising:

an elongated deck plate defining a coal feed path extending along the longitudinal axis of said conveyor system;
   a pair of parallel side members extending along opposite sides of the deck plate to further define said path;
   spaced elongated keys on and extending outwardly along the lateral edges of said deck plate;
   corresponding elongated slots in said side members to receive said keys; and
   means to attach said keys to said side members in said slots;
   whereby said deck plate is directly supported along its lateral edges by engagement of said keys with said side members for enhanced strength of the pan assembly.

2. The conveyor pan assembly of claim 1 wherein said slots are open to the outside of said side members to expose said keys.

3. The conveyor pan assembly of claim 2 wherein said means to attach said keys includes welds extending along said keys and the corresponding upper edge of said slots along the outside of said side members.

4. The conveyor pan assembly of claim 1 wherein said keys support said deck plate by resting on the lower edge of said slots.

5. The conveyor pan assembly of claim 1 wherein said side members include a top portion, a center portion including said slots and a base portion, said center portion being recessed from the outside with respect to the top/base portions, so as to substantially form a sigma cross section and thus protect the attaching means.

6. The conveyor pan assembly of claim 5 wherein said top portion of each of said side members includes an elongated concave wall along the inside defining the lateral limits of the feed path.

7. The conveyor pan assembly of claim 6 wherein the base portion includes a like elongated concave wall.

8. The conveyor pan assembly of claim 7 wherein the inside concave walls and adjacent inside center wall are free of welds for ease of manufacturing and enhanced life.

9. A conveyor pan assembly for an armored face conveyor system for handling coal or similar aggregate heavy material comprising:

an elongated deck plate defining a coal feed path extending along the longitudinal axis of said conveyor system;
   a pair of parallel side members extending along opposite sides of the deck plate to further define said path;
   at least one elongated key and slot unit providing support of said deck plate along its lateral edges and along the length of each side member; and
   means to attach said keys to said side members in said slots;
   whereby said deck plate is directly supported along its lateral edges by engagement of said keys with said side members for enhanced strength of the pan assembly.

10. The conveyor pan assembly of claim 9, wherein said side members support said deck plate during manufacturing.

11. The conveyor pan assembly of claim 10 wherein said keys rest on the lower support edge of said slots, and said attaching means includes a weld extending along the keys and the corresponding upper edges of said slots.

* * * * *